United States Patent
Voellm et al.

(10) Patent No.: US 7,100,172 B2
(45) Date of Patent: Aug. 29, 2006

(54) SYSTEM AND METHOD FOR CHANGING OPERATION OF AN APPLICATION WITHOUT RECOMPILING

(75) Inventors: Anthony F. Voellm, Redmond, WA (US); Ahmed H. Mohamed, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 659 days.

(21) Appl. No.: 10/305,850

(22) Filed: Nov. 27, 2002

(65) Prior Publication Data

US 2004/0103417 A1    May 27, 2004

(51) Int. Cl.
*G06F 13/00* (2006.01)
(52) U.S. Cl. .................... 719/332; 717/111; 717/140
(58) Field of Classification Search ................ 719/332; 717/111, 140
See application file for complete search history.

(56) References Cited

U.S. PATENT DOCUMENTS

| | | | |
|---|---|---|---|
| 6,141,698 A * | 10/2000 | Krishnan et al. | 719/331 |
| 6,611,878 B1 * | 8/2003 | De Armas et al. | 719/328 |
| 6,871,348 B1 * | 3/2005 | Hay | 719/310 |
| 6,915,513 B1 * | 7/2005 | Duesterwald et al. | 717/168 |
| 2003/0110307 A1 * | 6/2003 | De Armas et al. | 709/310 |

OTHER PUBLICATIONS

Lorch, "Building VTrace, A Tracer for Windows NT and Windows", Feb. 2000, pp. 1-24.*
Carlisle, Martin C., "*Graphics for Free*," SIGCSE Bulletin, vol. 31, No. 2, Jun. 1999, pp. 65-68.

* cited by examiner

*Primary Examiner*—William Thomson
*Assistant Examiner*—Phuong N. Hoang
(74) *Attorney, Agent, or Firm*—Merchant & Gould P.C.

(57) ABSTRACT

A system and method for altering the operation of a computer application while avoiding recompiling the computer application or modifying the kernel associated with the operating system of a computing device. A computer application is launched in a suspended mode. An asynchronous procedure call (APC) is used to load an additional dynamic link library (DLL) to be associated with the computer application. The additional DLL includes routines that operate differently than routines originally associated with the computer application through an initial DLL. The references to the routines within the computer application are redirected to the routines of the additional (DLL). The operation of the computer application is therefore changed while avoiding rewriting the application or changing the operating system.

21 Claims, 6 Drawing Sheets

SYSTEM AND METHOD FOR CHANGING OPERATION OF AN APPLICATION WITHOUT RECOMPILING

BACKGROUND OF THE INVENTION

An important factor in providing computer applications is the ability to update the functionality of the computer programs. New versions of the same computer programs are released on a regular basis. However, the continual release and update of computer applications tends to deter from the user experience in using the computer applications.

The most common method for updating a computer application is by recompiling or rewriting the computer application to change the operation of the computer application as desired. However, this update process consumes a user's time by forcing the user to update the computer application or purchase a new version of the computer application to be installed.

Another method for altering the operation of a computer program is to change the interaction of the operating system with the computer program. Functions within the kernel of the operating system may be changed such that when the computer application makes use of those functions, the operation of the computer application is also changed. However, changing the kernel for execution of the computer application consumes processing time since the kernel will need to be returned to its original state for other computer applications executed on a computing device.

SUMMARY OF THE INVENTION

The present invention is directed at a system and method for altering the operation of a computer application while avoiding recompiling the computer application or modifying the kernel of an operating system within a computing device. The present invention allows a computer application to take advantage of new features without the need to rewrite the computer application or change the fundamental operation of the computing device. In one example that is used throughout the detail description below, the input/output functionality of a computer application is changed without recompiling the computer application or modifying the kernel. The new functionality allows the computer application to communicate directly with a remote computing device, bypassing kernel mode operations originally required for such communication. The file system by which the computer application operates is therefore changed without having to change the application directly.

In one embodiment, new functionality is effectively added to the computer application by launching the computer application in a suspended mode. An asynchronous procedure call (APC) is registered with user process associated with the computer application. When the user process is unsuspended, the APC loads an additional dynamic link library (DLL) to be associated with the computer application. The additional DLL includes routines that operated differently than routines originally associated with the computer application. The references to the routines within the computer application are redirected to the routines of the additional DLL. The operation of the computer application is therefore changed while avoiding rewriting the application or changing the operating system.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

The inventors of the present invention have appreciated that a variety of functions may be changed or added to computer application according to the method provided without recompiling the computer application or modifying the kernel. The following detailed description focuses on changing the input/output operation of an application to take advantage of additional functionality. The input/output operation of the application is changed without recompiling the application. It is appreciated, in light of the following detailed description, that other functions may be changed or added to a computer application according to the present invention. These and other aspects of the invention will become apparent after reading the following detailed description.

Figure 1:
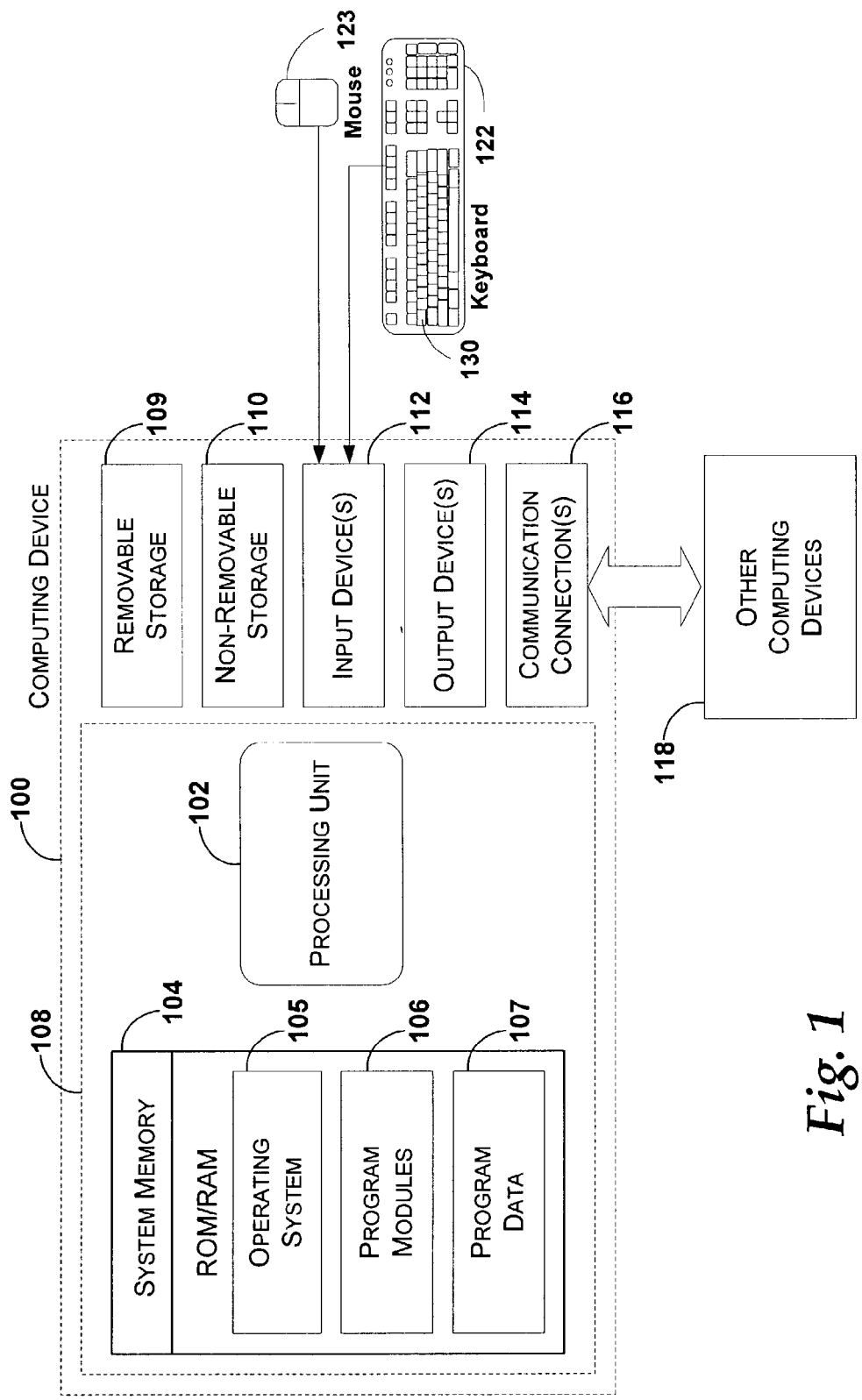
FIG. 1 illustrates an exemplary computing device that may be used in one exemplary embodiment of the present invention.

FIG. 1 illustrates an exemplary computing device that may be used in one exemplary embodiment of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
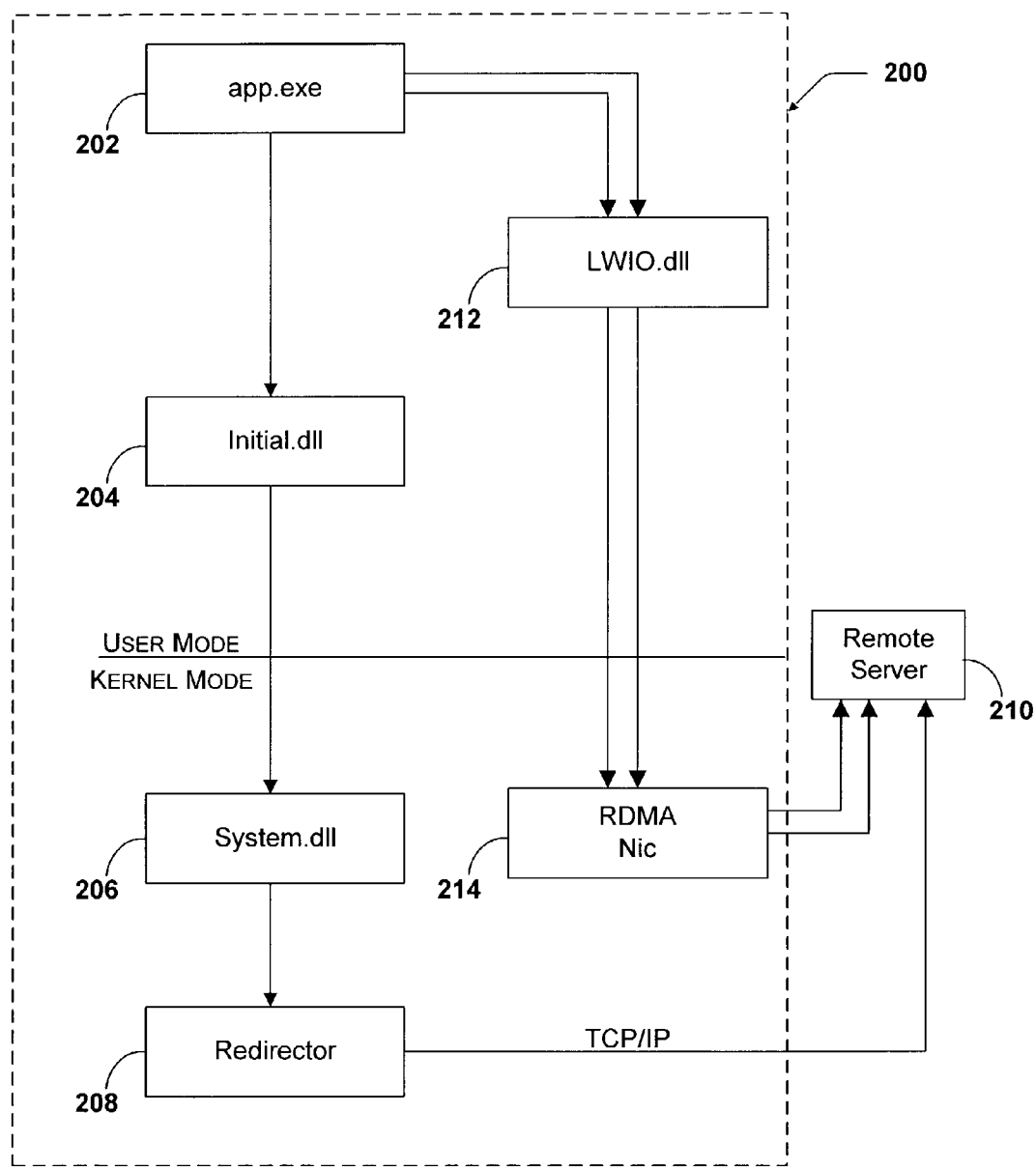
FIG. 2 is a functional block diagram illustrating two exemplary methods for transmitting data between an application and a remote computing device.

FIG. 2 is a functional block diagram illustrating two exemplary methods for allowing an application (i.e., app.exe) 202 to manipulate data stored on a remote computing device (i.e., remote server) 210. In one embodiment, app.exe 202 is an SQL (Structured Query Language) Server application that provides distributed database management by allowing multiple workstations to manipulate data stored on the remote server 210. Remote server 210 coordinates operations and performs resource-intensive calculations.

The first method for manipulating data stored on remote server 210 involves two or more dynamic link libraries (DLLs) (e.g., 204 and 206) and a redirector 208. DLLs are a feature of an operating system associated with computing device 200 that allow executable code modules to be loaded on demand and linked at run time. Library code is therefore field-updated while transparent to applications and then unloaded when no longer needed. The "dynamic" property of DLLs refers to the application linking to the DLL functions at run time, rather than linking to the functions when the application is compiled.

A redirector is networking software that accepts input/output request for remote files and then sends (redirects) them to a network service on a remote computing device. A redirector is typically a LAN (local area network) software module that implemented as a file system driver and is loaded into each network workstation. The redirector captures application requests for file sharing services and routes them through the network for action.

In the first method, processing routines for manipulating the data are associated with initial dynamic link library (i.e., initial.dll) 204. It is appreciated that initial.dll 204 may actually be more than one dynamic link library that is associated with app.exe 202. The routines of initial.dll 204 refer to routines provided by another dynamic link library 206 (system.dll) that is resident in the kernel mode of computing device 200. The combination of initial.dll 204 and system.dll 206 provide app.exe 202 with functionality for processing instructions through redirector 208 to manipulate data on remote server 210. In one embodiment, the instructions are transmitted according to TCP/IP. TCP/IP is well known in the art and need not be discussed at length here.

The second method for manipulating data on remote server 210 utilizes routines provided by another dynamic link library 212 (LWIO.dll) and an RDMA (Remote Directory Memory Access) capable NIC (Network Interface Card) 214. The functionality associated with LWIO.dll 212 provides for running app.exe 202 according to a new file system rather than the file system provided by the first method. The new file system may be described as a "kernel bypass file system" or a "direct access file system" because data is transmitted between the app.exe 202 and remote server 210 without consuming kernel resources. Instead of having to utilize kernel mode functionality of computing device 200, a direct access file system provides a high-level protocol for file-by-file transfer of data across a network between computing device 202 and remote server 210. The direct access file system bypasses the kernel mode operations of the first method, and allows direct communication between app.exe 202 and remote server 210 from user mode.

An RDMA capable NIC is a NIC with functionality for bypassing the kernel by exposing a mechanism to app.exe 202 for issuing input/output commands directly from user mode. RDMA eliminates the requirement of data copy operations associated with TCP/IP. These data copy operations add latency and may require significant CPU and memory resources. Also, each incoming network packet has enough information to allow it to be placed directly into a final destination memory address with minimal demands on memory bus bandwidth and CPU overhead. It is appreciated from the discussion above that protocols or functions other than RDMA may also be used to add or alter functionality associated with app.exe 202.

The present invention allows app.exe 202, originally compiled to communicate with remote server 210 according to the first method, to be altered to communicate with remote server 210 according to the second method without recompiling app.exe 202 or modifying the kernel. Avoiding modifying the kernel or recompiling app.exe 202 provides for adding functionality to an application without expending further user resources or kernel resources. Stated differently, neither the application nor the operating system needs to be modified in order to modify the functionality of the application. The structures and methods for changing operation of an application without recompiling are described in greater detail in the discussions accompanying FIG. 3–6 below.

Figure 3:
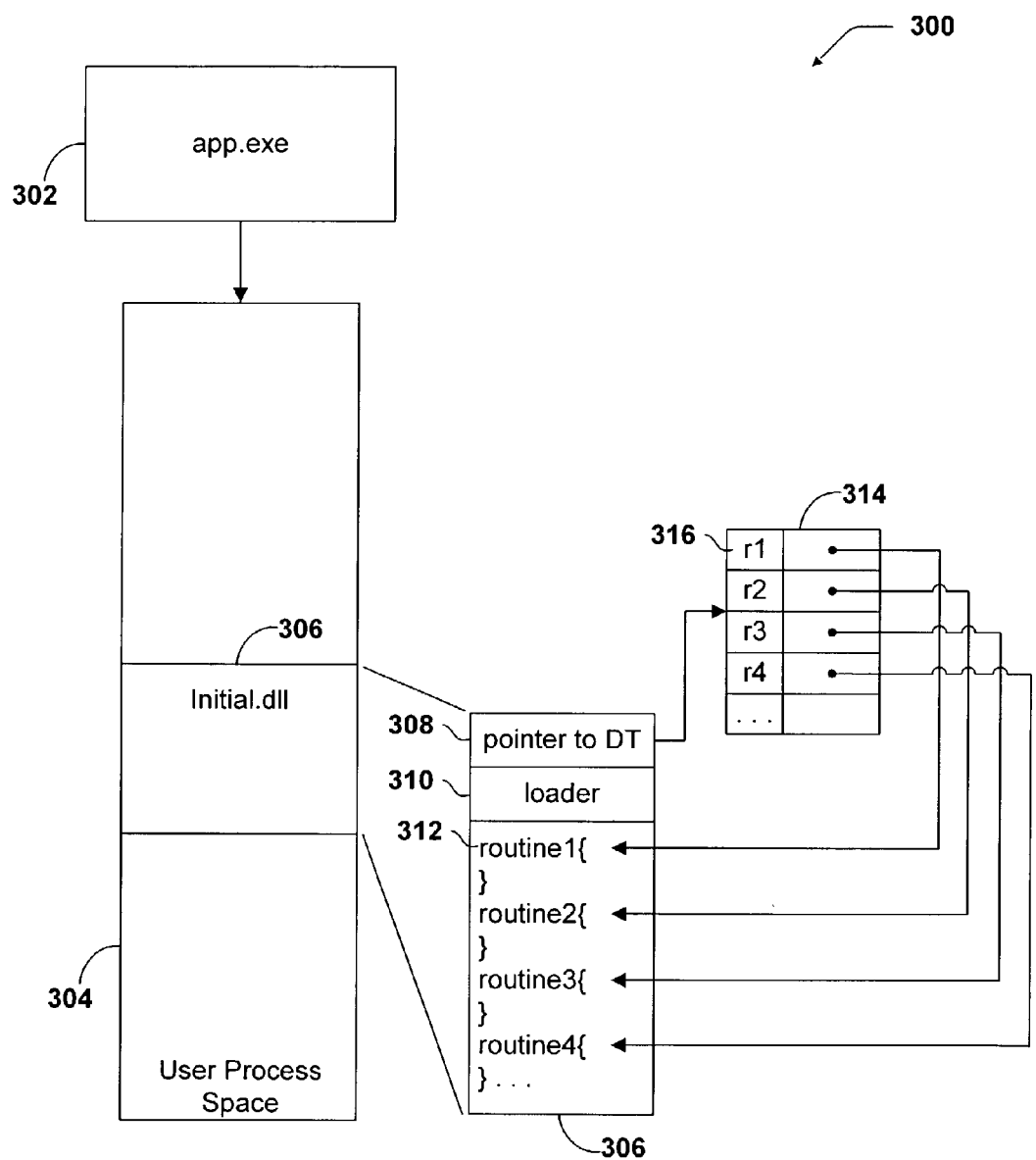
FIG. 3 is a functional block diagram illustrating exemplary components of a software environment for launching an application.

FIG. 3 is a functional block diagram illustrating exemplary components of a software environment 300 for launching an application. Shown in FIG. 3 is the application, app.exe 302 that is associated with a user process space 304 when the application is launched. In one embodiment, app.exe 302 is also included within user process space 304.

When app.exe 302 is launched, the DLLs (e.g., initial.dll) that correspond to app.exe 302 are mapped within user process space 304. The DLLs (e.g., initial.dll) include a variety of routines (e.g., 312) and a pointer to a dispatch table (e.g., 308). At least one of the DLLs includes a loader (e.g., 310). The loader (e.g., 310) loads each of the DLLs corresponding to app.exe 302. The loader (e.g., 310) resolves the addresses of each routine of each loaded DLL (e.g., 306). The dispatch table or indirection address table (IAT) 314 is also produced by loader 310. The dispatch table 314 includes entries (e.g., 316). Each entry includes the resolved addresses for each of the routines of the loaded DLLs. The resolved addresses in dispatch table 314 effectively operate as pointers such that when a routine is called in app.exe 302, the routine is located within the DLL according to dispatch table 314.

Figure 4:
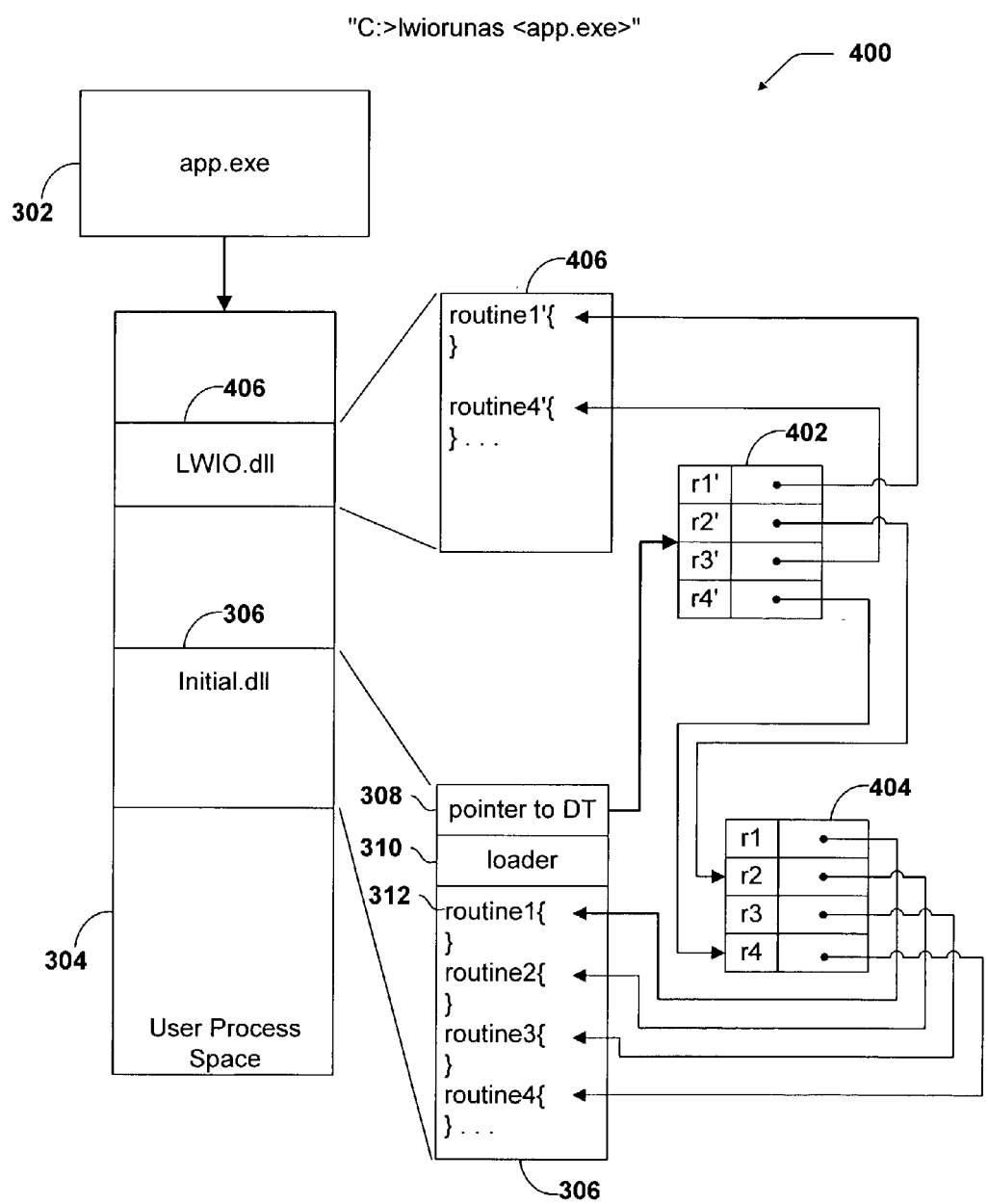
FIG. 4 is a functional block diagram illustrating components of a software environment in which the present invention may be implemented.

The present invention takes advantage of the presence of dispatch table 314 to reroute and effectively override dispatch calls of app.exe 302. The dispatch calls are effectively re-pointed to a new DLL other than the original DLL provided (e.g., 306) as illustrated in FIG. 4 below. The process for associating a new DLL with the application is further described in the discussion of FIG. 5 below.

FIG. 4 is a functional block diagram illustrating exemplary components of a software environment 400 in which the present invention may be implemented. The software environment 400 is similar to the software environment of FIG. 3. The software environment 400 further includes updated dispatch table 402, additional dispatch table 404, and dynamic link library (i.e., LWIO.dll) 406.

According to the present invention, app.exe is launched in response to a "LWIOrunas" command (e.g., "C:>lwiorunas <app.exe>") in order to add the functionality of LWIO to app.exe 302. The method for launching app.exe 302 according to a LWIOrunas" command is further described in the discussions of FIG. 5 and 6 below.

LWIO.dll 406 includes additional routines (e.g., routine 1') that provide functionality for "light-weight input/output" networking between app.exe 302 and a remote server (e.g., 210, see FIG. 2). With the addition of LWIO.dll 406 to user process space 304, an additional dispatch table 404 is generated. In one embodiment, the additional dispatch table 404 is a copy of the original dispatch table (314, see FIG. 3) generated by the loader 310. The additional dispatch table 404 maintains effective pointers to each of the routines of the initial dynamic link library (initial.dll) 306.

Correspondingly, the original dispatch table (314, see FIG. 3) is updated to produce updated dispatch table 402. Updated dispatch table 402 includes new pointers to LWIO.dll 406 for routines corresponding to the LWIO functionality (e.g., routine1'). For example, app.exe 302 includes a reference to routine1. Processing examines the pointer 308 of initial.dll to find the dispatch table to locate routine1. Pointer 308 directs processing to updated dispatch table 402. However, at updated dispatch table 402, the address for routine1 has changed. The address for routine1 now points to routine1' located in LWIO.dll 406 rather than routine1 of initial.dll 306. As a result, app.exe utilizes routine1 to perform the function requested rather than routine1 of initial.dll 306. The functionality provided by LWIO.dll 406 is thereby injected into the application without requiring the application to be rewritten or changing the operating system.

In one embodiment, when a routine is not changed to implement the LWIO functionality, the dispatch call corresponding to the routine in updated dispatch table 402 is still changed. The dispatch call is changed to point to the corresponding dispatch call of additional dispatch table 404. The dispatch call of additional dispatch table 404 points to the appropriate routine of initial.dll 306. For example, app.exe 302 includes a reference to routine2. The use of routine2 by app.exe 302 did not change with the addition of LWIO.dll 406. Processing examines the pointer 308 of initial.dll to locate the dispatch table that lists the address of routine2. Pointer 308 directs processing to updated dispatch table 402. Updated dispatch table 402 in turn points to the corresponding dispatch call of additional dispatch table 404. The corresponding dispatch call of additional dispatch table 404 continues to effectively point to routine2 located in initial.dll 306. As a result, app.exe utilizes routine2 of initial.dll 306 to perform the function requested. The functionality provided by LWIO.dll 406 is thereby injected into the application only for those functions required to implement the light-weight input/output operations. The operation of the other functions remains unchanged.

In another embodiment, additional dispatch table 404 is not included, and any routine unaffected by the additional LWIO functionality continues to have a dispatch call in updated dispatch table 402 that effectively points to the routine in initial.dll 306 directly. For example, app.exe 302 includes a reference to routine2. The use of routine2 by app.exe 302 did not change with the addition of LWIO.dll 406. According to the code already in app.exe 302, processing examines the pointer 308 of initial.dll to locate routine2. Pointer 308 directs processing to updated dispatch table 402. Updated dispatch table 402 continues to effectively point to routine2 located in initial.dll 306. As a result, app.exe utilizes routine2 of initial.dll 306 to perform the function requested. The functionality provided by LWIO.dll 406 is thereby injected into the application only for those functions required to implement the light- weight input/output operations. The operation of the other functions remains unchanged.

Figure 5:
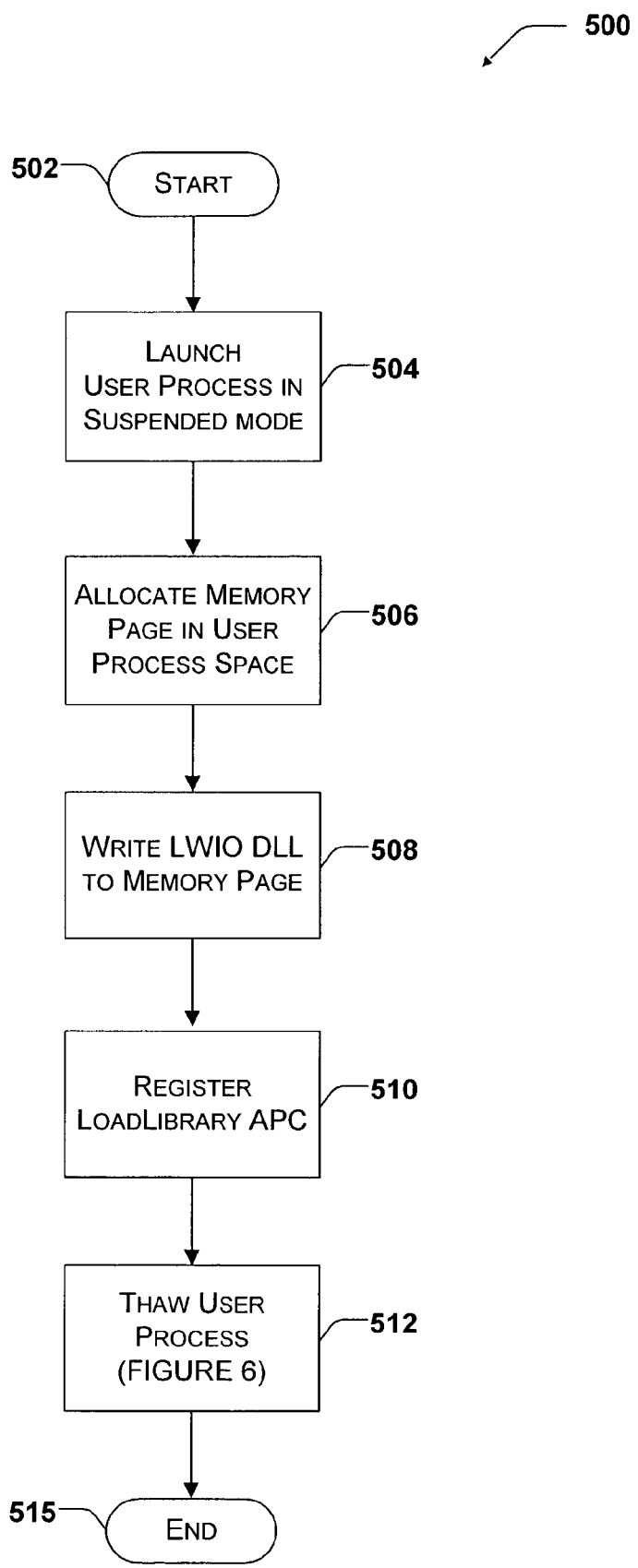
FIG. 5 is a flow diagram generally illustrating a process for initiating a computer application to change its functionality in accordance with the present invention.

FIG. 5 is a flow diagram generally illustrating a process for initiating a computer application to change its functionality in accordance with the present invention. The process 500 begins at start block 502 where the "LWIOrunas" command is entered by the user or other process in connection with a selected application. Processing continues at block 504.

At block 504, a user process associated with the selected application is launched in a suspended mode. Without placing the user process in a suspended mode, the application is executed according to its original functions. Placing the user process in a suspended mode ensures that the application may be altered to include additional functionality before being executed. Processing continues at block 506.

At block 506, a user memory page is allocated in the user process space associated with the selected application. The user memory page corresponds to allocated memory for use by the selected application. The user memory page is used to load each of the DLLs associated with the selected application (see FIGS. 3 and 4). Processing continues at block 508.

At block 508, the name of the LWIO DLL (e.g., "LWIO.dll") is written to the memory page. The text string "LWIO.dll" is written to the memory page, rather than the LWIO DLL itself. The process 500 continues at block 510.

At block 510, an asynchronous procedure call (APC) is registered with the user process for a LoadLibrary function with the user memory page as the argument for the APC. LoadLibrary is a function that maps the specified DLL into the address space of the calling process. Processing continues at block 512.

At block 512, the user process is thawed such that the process exits the suspended mode and begins to execute the application. The operations that occur when the user process is thawed are described in greater detail in the discussion of FIG. 6. Processing then continues to block 515 where processing ends.

Figure 6:
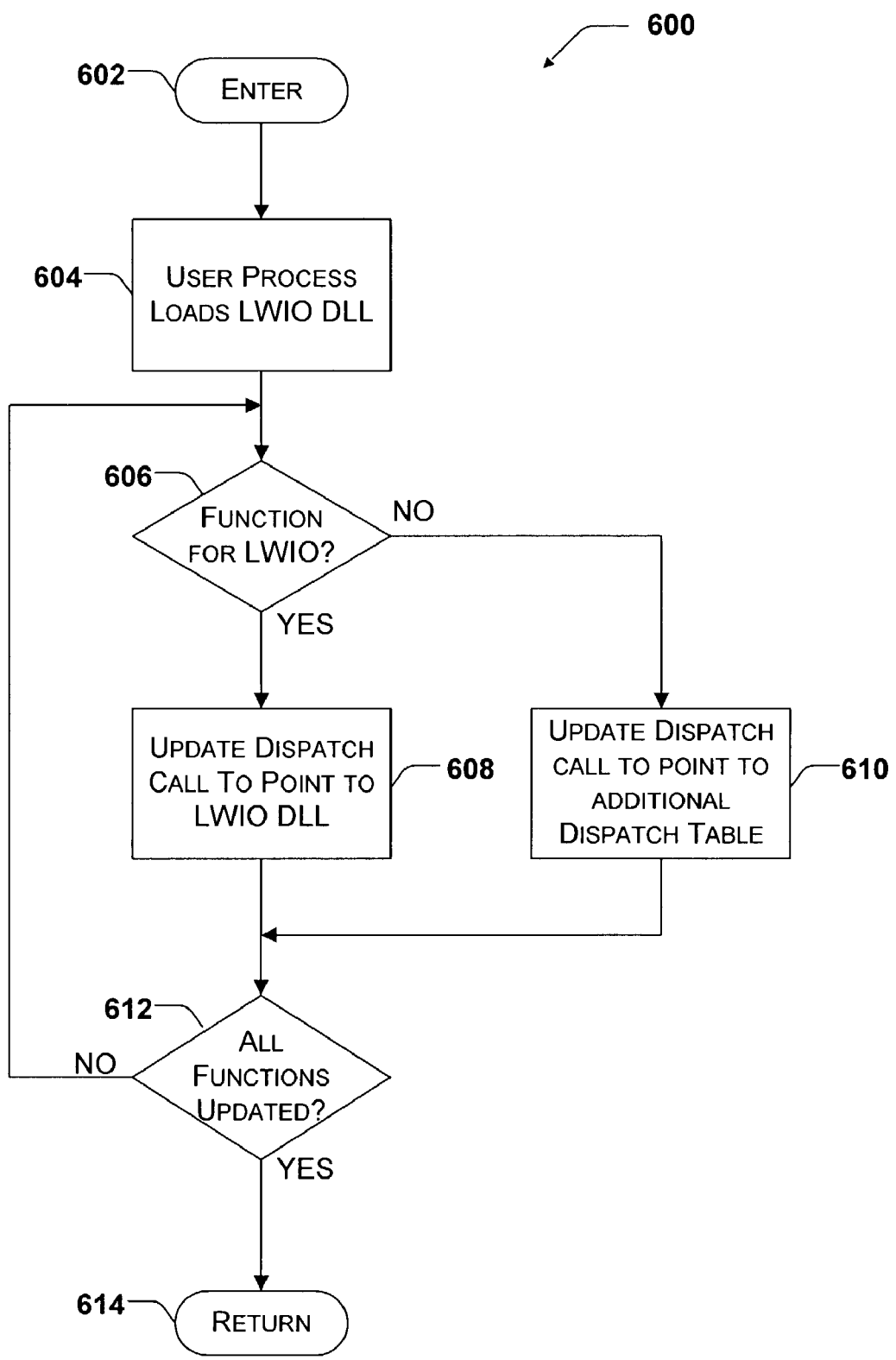
FIG. 6 is a flow diagram generally illustrating a process for changing the functionality of a computer program in accordance with the present invention.

FIG. 6 is a flow diagram generally illustrating a process for changing the functionality of a computer program in accordance with the present invention. The process 600 enters at block 602 when process 500 shown in FIG. 5 enters block 512. Processing continues at block 604.

At block 604, the user process is running and the LoadLibrary APC registered with the user process is executed with its entry point being called as the first step of the user process. Processing continues at decision block 606.

At decision block 606, a determination is made whether a dispatch call of the dispatch table corresponds to a routine for implementing the LWIO kernel bypass file system. If the dispatch call corresponds to a routine for implementing the LWIO kernel bypass file system, processing continues at block 608.

At block 608, the dispatch call is updated to point to the corresponding routine of the LWIO DLL. Accordingly, as the application is executed, the input/output characteristics of the application are implemented according to the LWIO kernel bypass file system. The process 600 then proceeds to decision block 612.

Returning to decision block 606, if the dispatch call does not correspond to a routine for implementing the LWIO kernel bypass file system, the process continues at block 610. At block 610, the dispatch call is updated to point to the corresponding dispatch call of the additional dispatch table. The corresponding dispatch call of the additional dispatch table points the original routine of the initial DLL. In another embodiment, the dispatch call may be updated to point directly to the original routine of the initial DLL. The process 600 then proceeds to decision block 612.

At decision block 612, a determination is made whether all of the dispatch calls of the updated dispatch table have been updated in order to update all the functions associated with the selected application. If all the functions have not been updated, processing returns to decision block 606 repeat the process for the next function. If all the functions have been updated, processing continues to block 614. At block 614, processing returns to block 515 of process 500 shown in FIG. 5 where the processing ends.

An advantage of the present invention is that the original functionality of the computer application remains intact for other executions of the computer application. For example, a computing device includes an RDMA capable NIC. The "LWIOrunas" command is used in association with a computer application to take advantage of the additional functionality provided by the RDMA capable NIC. In contrast, the computer application may be executed normally (without the "LWIOrunas" command) to run the computer application to its original input/output operation.

It is appreciated from the above disclosure that the implementation described focuses on changing the input/output operation of an application to take advantage of additional input/output functionality. The input/output operation of the application is changed without recompiling the application. However, other functions may be changed or added to a computer application according to the present invention that affect aspects of an application other than the input/output operation.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for changing the operation of an application by rerouting dispatch calls with an updated dispatch table, wherein routines that require updating are rerouted to an update dynamic link library and routines that do not require updating are rerouted back to an original dynamic link library, the method comprising:
    launching a user process associated with the application in a suspended mode;
    launching a user memory page in association with launching the user process;
    writing an asynchronous procedure call to the user process, wherein the asynchronous procedure call is configured to associate the application with an update dynamic link library;
    writing a text string corresponding to the update dynamic link library to the user memory page such that the user memory page is utilized as an argument of the asynchronous procedure call in associating the update dynamic link library with the application;
    thawing the user process when the asynchronous procedure call is written;
    executing the asynchronous procedure call to call routines associated with an application, wherein the call is routed to an updated dispatch table, wherein the updated dispatch table includes updated addresses for routing;
    pointing to a routine associated with the update dynamic link library when the routine requires updating; and
    pointing to a routine associated with the original dynamic link library when the routine does not require updating.

2. The computer-implemented method of claim 1, wherein recompiling the application is avoided.

3. The computer-implemented method of claim 1, wherein modification to a kernel of a computing device associated with the, application is avoided.

4. The computer-implemented method of claim 1, further comprising generating an original dispatch table in association with launching the user process.

5. The computer-implemented method of claim 4, wherein the original dispatch table is updated .to generate an updated dispatch table having entries that include new addresses corresponding to routines associated with the update dynamic link library.

6. The computer-implemented method of claim 4, wherein a copy of the original dispatch table is made that maintains addresses for routines associated with the original dynamic link library.

7. The computer-implemented method of claim 6, wherein the updated dispatch table is updated with pointers to the copy of the original dispatch table for routines that do not require updating.

8. The computer-implemented method of claim 1, wherein the updated dispatch table is updated with pointers to routines of the original dynamic link library.

9. A computer-implemented method for changing the operation of an application by rerouting dispatch calls with an updated dispatch table, wherein routines that require updating are rerouted to a second dynamic link library and routines that do not require updating are rerouted back to a first dynamic link library, the method comprising:
    launching a user process associated with the application in a suspended mode such that the first dynamic link library is mapped to user memory associated with the user process;
    launching a user memory page in association with launching the user process;
    producing an original dispatch table that includes entries for addresses of routines corresponding to the first dynamic link library;
    producing an updated dispatch table, wherein the updated dispatch includes updated addresses of routines;

writing an asynchronous procedure call to the user process while the user process is in the suspended mode;
writing a text string corresponding to the update dynamic link library to the user memory page such that the user memory page is utilized as an argument of the asynchronous procedure call in associating the update dynamic link library with the application;
thawing the user process;
executing the asynchronous procedure call to call the updated dispatch table;
determining when an address of the updated dispatch table corresponds to an update routine;
pointing to a routine associated with the second dynamic link library when the routine requires updating; and
pointing to a routine associated with the first dynamic link library when the routine does not require updating.

10. The computer-implemented method of claim 9, further comprising copying the original dispatch table, pointing to an address of the copied original dispatch table when the routine does not require updating, and pointing from the copied original dispatch table to the first dynamic link library.

11. The computer-implemented method of claim 9, wherein pointing to a routine associated with the first dynamic link library includes point directly to a routine associated with the first dynamic link library.

12. The computer-implemented method of claim 9, wherein recompiling the application is avoided.

13. The computer-implemented method of claim 9, wherein modification to a kernel of a computing device associated with the application is avoided.

14. A computing device, comprising:
a processor; and
a memory into which a plurality of instructions are loaded, the plurality of instructions performing a method comprising:
launching a user process associated with the application in a suspended mode;
launching a user memory page in association with launching the user process;
writing an asynchronous procedure call to the user process, wherein the asynchronous procedure call is configured to associates the application with an update dynamic link library;
writing a text string corresponding to the update dynamic link library to the user memory page such that the user memory page is utilized as an argument of the asynchronous procedure call in associating the update dynamic link library with the application;
thawing the user process when the asynchronous procedure call is written;
executing the asynchronous procedure call to call routines associated with an-application, wherein the call is routed to an updated dispatch table, wherein the updated dispatch table includes updated addresses for routing;
pointing to a routine associated with the update dynamic link library when the routine requires updating; and
pointing to a routine associated with the original dynamic link library when the routine does not require updating.

15. The computing device of claim 14, wherein recompiling the application is avoided.

16. The computing device of claim 14, wherein modification to a kernel of the computing device is avoided.

17. The computing device of claim 14, further comprising generating an original dispatch table in association with launching the user process.

18. The computing device of claim 17, wherein the original dispatch table is updated to generate an updated dispatch table having entries that include new addresses corresponding to routines associated with the update dynamic link library.

19. The computing device of claim 17, wherein a copy of the original dispatch table is made that maintains addresses for routines associated with the original dynamic link library.

20. The computing device of claim 19, wherein the updated dispatch table is updated with pointers to the copy of the original dispatch table for routines that do not require updating.

21. The computing device of claim 14, wherein the updated dispatch table is updated with pointers to routines of the original dynamic link library.

* * * * *

UNITED STATES PATENT AND TRADEMARK OFFICE
CERTIFICATE OF CORRECTION

| | |
|---|---|
| PATENT NO. | : 7,100,172 B2 |
| APPLICATION NO. | : 10/305850 |
| DATED | : August 29, 2006 |
| INVENTOR(S) | : Voellm et al. |

It is certified that error appears in the above-identified patent and that said Letters Patent is hereby corrected as shown below:

On the Title page, in field (56), under "U.S. Patent Documents", in column 2, line 1, after "6,871,348 B1 * 3/2005" delete "Hay" and insert -- Cooper --, therefor.

In column 8, line 31, in Claim 3, delete "the, application" and insert -- the application --, therefor.

In column 8, line 36, in Claim 5, delete "updated .to" and insert -- updated to --, therefor.

In column 9, line 43, in Claim 14, delete "associates" and insert -- associate --, therefor.

In column 10, line 10, in Claim 14, delete "an-application" and insert -- an application --, therefor.

Signed and Sealed this

Twentieth Day of April, 2010

David J. Kappos
*Director of the United States Patent and Trademark Office*